Dec. 30, 1969   G. ELTZE   3,486,459
INTERNALLY TOOTHED GEAR PUMP, ESPECIALLY FOR THE PRESSURE
MEDIUM SUPPLY OF AUTOMATIC CHANGE-SPEED TRANSMISSIONS
Filed Feb. 28, 1968

INVENTOR
GEORG ELTZE

BY *Craig & Antonelli*

ATTORNEYS

United States Patent Office 3,486,459
Patented Dec. 30, 1969

3,486,459
INTERNALLY TOOTHED GEAR PUMP, ESPECIALLY FOR THE PRESSURE MEDIUM SUPPLY OF AUTOMATIC CHANGE-SPEED TRANSMISSIONS
Georg Eltze, Stuttgart-Riedenberg, Germany, assignor to Daimler-Benz Aktiengesellschaft, Stuttgart-Unterturkheim, Germany
Filed Feb. 28, 1968, Ser. No. 709,136
Claims priority, application Germany, Feb. 28, 1967, D 52,402
Int. Cl. F04c 1/06
U.S. Cl. 103—126      6 Claims

ABSTRACT OF THE DISCLOSURE

An internally toothed gear pump, especially for use in the supply of pressure medium for automatic transmissions, in which an approximately sickle-shaped segment is arranged between the internally toothed gear and the externally toothed gear and in which this segment is so arranged between the two gears that it is freely movable in at least one direction.

BACKGROUND OF THE INVENTION

Figure 1:
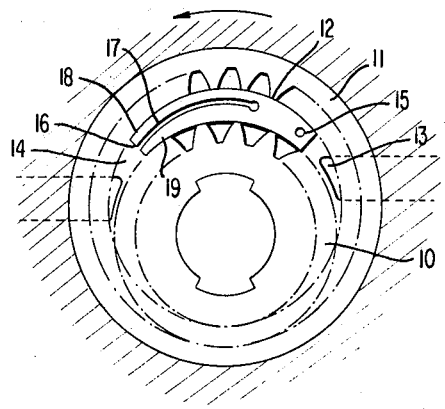

The present invention relates to an internally toothed gear pump, especially for the pressure medium supply of automatically shifting change-speed transmissions, in which an approximately sickle-shaped segment is arranged between the internally toothed gear and the externally toothed gear.

Pumps of the aforementioned type have been known for some time in the prior art. They have also been used for quite some time for the pressure oil supply in automatic change-speed transmissions. In connection with such transmissions, these gear pumps are particularly advantageous as so-called primary pumps which are driven directly from a hydraulic transmission part, for example, from a torque converter connected in the input of the mechanical transmission part. The difficulty with these prior art pumps resides frequently in achieving a sufficiently accurate sealing of the segment with respect to both sets of gear teeth. Additionally, the problem of noise development plays a role because these pumps are driven normally with relatively high rotational speed. It has been found that oftentimes disagreeable and unpleasant noises are developed by the pressure shocks pulsating at high frequency. Consequently, the type and quality of the sealing can have an effect not only directly on the pressure behavior but indirectly also on the noise development in the pump.

SUMMARY OF THE INVENTION

The present invention aims at improving the seal in such pumps for the reasons mentioned above. The underlying problems are solved with the pumps of the aforementioned type in that the segment is arranged between the two gears freely movable in at least one direction. Naturally, directions are contemplated which are disposed in the gear plane. In one construction according to the present invention, the segment disposed between the gears is pivotally supported at or near one end—preferably near the end associated with or to the suction side—on a pin or the like extending parallel to the gear axes. In this manner, the segment acts as a self-adjusting sealing element, so to speak of. It is no longer fixed in the housing, but is able to adapt itself better, for example, to the non-uniformity of the gears.

The self-adjusting effect can be further improved in that one gives complete freedom to the segment. It is then displaced by the pressure automatically and completely freely toward the suction side between the gear teeth. This will not be suitable for all pumps because of the occurring loads and stresses. Consequently, the present invention prefers a solution whereby the segment is supported with its end face facing on the suction side on a pin parallel to the gear axis or against a similar abutment. In all these cases, the segment is limited in its freedom of movement according to the present invention in the direction toward the pressure side by an abutment. As a result thereof, during starting—when no pressure exists—a sufficient sealing effect is assured.

The described effects can be further improved in that according to a preferred embodiment of the present invention, the segment is provided with a longitudinal slot open toward the pressure side for the formation of two tongue portions facing the teeth. In this manner, the segment is split up into two springy or elastic tongues which are able to abut elastically against the gear wheels in dependence on the pressure of the pump. In order that a sufficient sealing effect can be achieved also in the pressure-less condition, for example, during starting, the present invention further proposes that one or several expanding springs are arranged in the slot of the segment. The two tongue portions of the segment are then elastically pressed with a slight pre-stress by these expanding springs against the gear wheels. The construction of the springs themselves is thereby without significance. Coil springs, hair-pin springs or leaf springs can be used. The slot may be enlarged according to the present invention at its inner end, and this enlargement may accommodate the abutment. Finally, it is also possible to bevel off one lateral surface of the segment in the direction toward the pressure side in order to accurately control the pressure buildup in the slot.

Accordingly, it is an object of the present invention to provide a gear pump of the type described above which eliminates by extremely simple means the aforementioned shortcomings and drawbacks encountered in the prior art constructions.

Another object of the present invention resides in an internally toothed gear pump, especially for the pressure medium supply of automatic transmissions which permits a sufficiently accurate seal of the segment disposed between the gears and which thus minimizes the development of noises during operation of the pump.

A further object of the present invention resides in a gear pump of the type described above in which the segment disposed between the gears is able to adapt itself more readily to the non-uniformity of the gears.

A still further object of the present invention resides in a gear pump of the type described above which not only achieves all of the aforementioned aims and objects but also assures sufficient sealing effect during starting of the pump.

Figure 2:
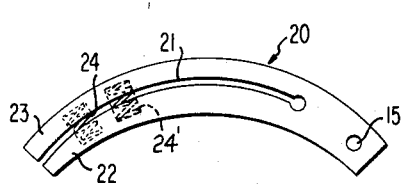
Figure 3:
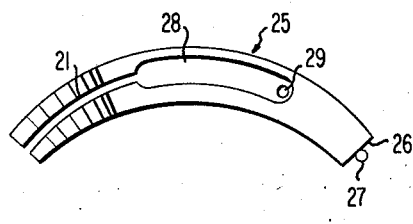

These and further objects, features and advantages of the present invention will become more obvious from the following description when taken in connection with the accompanying drawing which shows, for purposes of illustration only, several embodiments in accordance with the present invention, and wherein:

FIGURE 1 is a schematic cross-sectional view through an internally toothed pump in accordance with the present invention; and FIGURES 2 and 3 are elevational views, on an enlarged scale, of two modified embodiments of segments according to the present invention for use in internally toothed pumps.

Referring now to the drawing wherein like reference numerals are used throughout the various views to designate like parts, and more particularly to FIGURE 1, the externally toothed pump gear 10 engages in a conventional manner with the internally toothed pump gear 11. Both gears 10 and 11 are arranged in a housing only schematically indicated and sealed with respect thereto in an otherwise conventional manner. A segment generally designated by reference numeral 12 is disposed between the two gears 10 and 11 which rests sealingly against the housing end faces and against the teeth. Both gears 10 and 11 rotate in the counter-clockwise direction, and the segment 12 separates the suction side 13 from the pressure side 14.

The segment 12 is supported in proximity to its end facing the suction side 13 on a pin 15 which is secured in the housing and extends parallel to the pump axis. The segment 12 is pivotal about this pin 15 so that it can adapt itself to the non-uniformity of the teeth. The segment 12 is further slotted from its end face 16 facing the pressure side 14 and this slot 17 subdivides the segment 12 over a part of its length into two tongue portions 18 and 19. The outer tongue 18 abuts against the internally toothed gear 11 and the inner tongue 19 against the externally toothed gear 10. This abutment is produced or reinforced by the pressure which can build up in the slot 17 from the pressure side 14 thereof.

FIGURE 2 illustrates on an enlarged scale a segment generally designated by reference numeral 20. This segment 20 is again supported in the housing by a pin 15. A coil spring 24 is arranged or coil springs 24, 24' are arranged between the tongues 22 and 23 formed by the slot 21 which coil spring expands the tongue portions and therewith causes abutment thereof against the gear wheels. A sufficient sealing effect of the segment 20 with respect to the two gear wheels is achieved in this manner, for example, during starting from the pressure-less condition. This abutment is then reinforced by the pressure building up with increasing rotational speed.

According to FIGURE 3, the segment 25 is supported at its end face 26 facing the suction side on a pin 27. Hence, it can freely adjust itself—up to this abutment—in the gear plane. The slot 21 terminates in an enlargement 28 in which is arranged an abutment 29. This abutment 29 limits with corresponding play the taking along of the segment in the direction of rotation of the gears during starting of the pump without pressure. This abutment may also be disposed on the pressure end face of the segment. As shown on FIGURE 3, one lateral surface of the segment 25 is beveled off in the direction toward the pressure side. This lateral beveling permits the pressure build-up in the slot 21 to be accurately controlled.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

What is claimed is:

1. An internally toothed gear pump, especially for the pressure medium supply of automatic transmissions, which includes an internally toothed gear, an externally toothed gear, and a sickle-shaped segment arranged between the two gears, said segment means being provided with a longitudinal slot open toward the pressure side to form two tongue portions facing the teeth of the gear means, wherein the improvement comprises said segment means being supported with its end face disposed on the suction side on a pin extending substantially parallel to the pump axis, and abutment means being provided for permitting said segment means to have limited freedom of movement in the direction toward the pressure side with slight play.

2. A gear pump according to claim 1, wherein said abutment means consists of the longitudinal slot of said segment means being enlarged at one end and accommodating an abutment pin.

3. A gear pump according to claim 2, further comprising expanding spring means arranged in the slot.

4. A gear pump according to claim 3, wherein several spring means are arranged in the slot.

5. A gear pump according to claim 1, wherein said segment means is beveled off in the direction toward the pressure side at a surface abutting at a housing.

6. A gear pump according to claim 5, wherein said abutment means consists of the longitudinal slot of said segment means being enlarged at one end and accommodating an abutment pin.

References Cited

UNITED STATES PATENTS

| | | |
|---|---|---|
| 1,604,802 | 10/1926 | Brenzinger. |
| 1,646,615 | 10/1927 | Furness. |
| 1,816,508 | 7/1931 | Wilsey. |
| 2,482,713 | 9/1949 | Jones. |
| 2,875,700 | 3/1959 | Hardy. |
| 3,270,679 | 9/1966 | Sand et al. |

WILLIAM H. FREEH, Primary Examiner

WILBUR J. GOODLIN, Assistant Examiner